(12) United States Patent
Silverman et al.

(10) Patent No.: US 7,050,447 B2
(45) Date of Patent: May 23, 2006

(54) MULTI-LEVEL EXPEDITED FORWARDING PER HOP BEHAVIOR

(75) Inventors: Steven P. Silverman, Front Royal, VA (US); Daniel T. Sullivan, Fort Washington, MD (US)

(73) Assignee: Houston Associates, Inc., Arlington, VA (US)

( * ) Notice: Subject to any disclaimer, the term of this patent is extended or adjusted under 35 U.S.C. 154(b) by 77 days.

(21) Appl. No.: 10/764,656

(22) Filed: Jan. 26, 2004

(65) Prior Publication Data

US 2004/0156380 A1 Aug. 12, 2004

Related U.S. Application Data

(60) Provisional application No. 60/442,423, filed on Jan. 24, 2003.

(51) Int. Cl.
H04L 12/28 (2006.01)
H04L 12/56 (2006.01)

(52) U.S. Cl. .................... 370/412; 370/235; 370/235.1; 370/229; 370/238; 370/238.1; 370/389; 370/392

(58) Field of Classification Search ................. 370/235, 370/235.1, 229, 238, 389, 395.4, 412, 468, 370/438, 392, 400, 463, 238.1
See application file for complete search history.

(56) References Cited

U.S. PATENT DOCUMENTS

| | | | |
|---|---|---|---|
| 6,188,698 B1 * | 2/2001 | Galand et al. | 370/412 |
| 6,363,053 B1 | 3/2002 | Schuster et al. | 370/230 |
| 6,430,154 B1 | 8/2002 | Hunt et al. | 370/230.1 |
| 6,760,309 B1 * | 7/2004 | Rochberger et al. | 370/235 |
| 2001/0033566 A1 | 10/2001 | Grimes | 370/352 |
| 2001/0046288 A1 | 11/2001 | Grimes | 379/322 |
| 2002/0105965 A1 * | 8/2002 | Dravida et al. | 370/463 |
| 2003/0185217 A1 * | 10/2003 | Ganti et al. | 370/395.5 |

OTHER PUBLICATIONS http://www.ietf.org/rfc/rfc2474.txt, Definition of the Differentiated Services Field (DS Field) in the IPv4 and IPv6 Headers.
http://www.ietf.org/rfc/rfc2475.txt, An Architecture for Differentiated Services.
http://www.ietf.org/rfc/rfc2597.txt, Assured Forwarding PHB Group.
http://www.ietf.org/rfc/rfc2598.txt, An Expedited Forwarding PHB.
http://www.ietf.org/rfc/rfc3246.txt, An Expedited Forwarding PHB (Per –Hop Behavior).

* cited by examiner

*Primary Examiner*—Wellington Chin
*Assistant Examiner*—Chuong Ho
(74) *Attorney, Agent, or Firm*—R. Christopher Rueppell; Gregory M. Stone; Jeffrey C. Maynard

(57) ABSTRACT

A method and system utilizing a multi-level expedited forwarding per hop behavior (MLEF PHB) which manages buffer space to provide priority to calls based on a predefined priority scheme. The MLEF PHB defines a set of configurable parameters that define how much buffer space is available to each class or level of voice call. The MLEF PHB may optionally be implemented as programming statements in the SIP User Agent, SIP Proxy, and kernel of a LINUX-based PC router. The MLEF PHB applies an algorithm for dropping packets exceeding a caller precedence level-specific buffer capacity, which variable buffer capacity is determined by the particular DSCP (and the particular MLEF PHB to which it relates).

26 Claims, 9 Drawing Sheets

FIGURE 1

SIP Address Prefix to Set Precedence

| Call Precedence | SIP Call Prefix | Resource-Priority Header Value | DiffServ Value (decimal) | ToS Byte Value (decimal) |
|---|---|---|---|---|
| Routine | *91* | dsn.routine | 46 | 184 |
| Priority | *92* | dsn.priority | 45 | 180 |
| Immediate | *93* | dsn.immediate | 44 | 176 |
| Flash | *94* | dsn.flash | 43 | 172 |
| Flash-Override | *95* | dsn.flash-override | 42 | 168 |

FIGURE 18

ToS Values For Call Packets (Priority Queue)

| Call Precedence | DiffServ Value (decimal) | ToS Byte Value (decimal) | Maximum Number Queued |
|---|---|---|---|
| Routine | 46 | 184 | 24 |
| Priority | 45 | 180 | 28 |
| Immediate | 44 | 176 | 32 |
| Flash | 43 | 172 | 36 |
| Flash-Override | 42 | 168 | 40 |

FIGURE 3

```
INVITE sip:*92*robot@sipserver.mobilesrv.com:5060 SIP/2.0
Via: SIP/2.0/UDP 192.168.2.102:5060
From: softphone1 <sip:softphone1@192.168.2.102:5060;user=phone>
To: *92*robot<sip:*92*robot@sipserver.mobilesrv.com:5060>
Call-ID: 103b0c00ccccccccccccccccccccccccc@192.168.2.102
CSeq: 1 INVITE
Subject: VovidaINVITE
Contact: <sip:softphone1@192.168.2.102:5060;user=phone>
Content-Type: application/sdp
Content-Length: 216 v=0
o=- 32130 32130 IN IP4 192.168.2.102
s=VOVIDA Session
c=IN IP4 192.168.2.102
t=3249381219 0
m=audio 10000 RTP/AVP 0 100
a=rtpmap:0 PCMU/8000
a=rtpmap:100 telephone-event/8000
a=ptime:20
a=fmtp:100 0-11
```

FIGURE 4

```
INVITE sip:robot@192.168.1.234:5001;user=phone SIP/2.0
Via: SIP/2.0/UDP 192.168.1.234:5060;branch=z9hG4bKld3ecaf6733964c4dcfa9cc40adb098c3
Via: SIP/2.0/UDP 192.168.2.102:5060
Record-Route: <sip:192.168.1.234:5060;transport=UDP;maddr=192.168.1.234>
From: softphone1 <sip:softphone1@192.168.2.102:5060;user=phone>
To: *92*robot <sip:robot@sipserver.mobilesrv.com:5060>
Call-ID: 103b0c00ccccccccccccccccccccccccc@192.168.2.102
Resource-Priority: dsn.priority
CSeq: 1 INVITE
Contact: <sip:softphone1@192.168.2.102:5060;user=phone>
subject: VovidaINVITE
Content-Type: application/sdp
Content-Length: 216 v=0
o=- 32130 32130 IN IP4 192.168.2.102
s=VOVIDA Session
c=IN IP4 192.168.2.102
t=3249381219 0
m=audio 10000 RTP/AVP 0 100
a=rtpmap:0 PCMU/8000
a=rtpmap:100 telephone-event/8000
a=ptime:20
a=fmtp:100 0-11
```

FIGURE 5

```
SIP/2.0 180 Ringing
Via: SIP/2.0/UDP 192.168.1.234:5060;branch=z9hG4bKId3ecaf6733964c4dcfa9cc40adb098c3
Via: SIP/2.0/UDP 192.168.2.102:5060
To: *92*robot<sip:robot@sipserver.mobilesrv.com:5060>
From: softphone1<sip:softphone1@192.168.2.102:5060;user=phone>
Call-ID: 103b0c00cccccccccccccccccccccccc@192.168.2.102
CSeq: 1 INVITE
Content-Length: 0
```

FIGURE 6

```
SIP/2.0 180 Ringing
Via: SIP/2.0/UDP 192.168.2.102:5060
From: softphone1 <sip:softphone1@192.168.2.102:5060;user=phone>
To: *92*robot <sip:*92*robot@sipserver.mobilesrv.com:5060>
Call-ID: 103b0c00cccccccccccccccccccccccc@192.168.2.102
CSeq: 1 INVITE
Content-Length: 0
```

FIGURE 7

```
SIP/2.0 200 OK
Via: SIP/2.0/UDP 192.168.1.234:5060;branch=z9hG4bKId3ecaf6733964c4dcfa9cc40adb098c3
Via: SIP/2.0/UDP 192.168.2.102:5060
To: *92*robot<sip:robot@sipserver.mobilesrv.com:5060>;tag=2c0343a6
From: softphone1<sip:softphone1@192.168.2.102:5060;user=phone>
Call-ID: 103b0c00cccccccccccccccccccccccc@192.168.2.102
CSeq: 1 INVITE
Record-Route: <sip:192.168.1.234:5060;transport=UDP;maddr=192.168.1.234>
Contact: <sip:robot@192.168.1.234:5001>
Content-Type: application/sdp
Content-Length: 170 v=0
o=- 3249384273 3249384273 IN IP4 192.168.1.234
s=VOVIDA Session
c=IN IP4 192.168.1.234
t=3249384273 0
m=audio 10100 RTP/AVP 0
a=rtpmap:0 PCMU/8000
a=ptime:20
```

FIGURE 8

```
SIP/2.0 200 OK
Via: SIP/2.0/UDP 192.168.2.102:5060
Record-Route: <sip:192.168.1.234:5060;transport=UDP;maddr=192.168.1.234>
From: softphone1 <sip:softphone1@192.168.2.102:5060;user=phone>
To: *92*robot <sip:*92*robot@sipserver.mobilesrv.com:5060>;tag=2c0343a6
Call-ID: 103b0c00cccccccccccccccccccccccc@192.168.2.102
CSeq: 1 INVITE
Contact: <sip:robot@192.168.1.234:5001>
Content-Type: application/sdp
Content-Length: 170 v=0
o=- 3249384273 3249384273 IN IP4 192.168.1.234
s=VOVIDA Session
c=IN IP4 192.168.1.234
t=3249384273 0
m=audio 10100 RTP/AVP 0
a=rtpmap:0 PCMU/8000
a=ptime:20
```

FIGURE 9

```
ACK sip:192.168.1.234:5060;transport=UDP;maddr=192.168.1.234 SIP/2.0
Via: SIP/2.0/UDP 192.168.2.102:5060
From: softphone1<sip:softphone1@192.168.2.102:5060;user=phone>
To: *92*robot<sip:*92*robot@sipserver.mobilesrv.com:5060>;tag=2c0343a6
Call-ID: 103b0c00cccccccccccccccccccccccc@192.168.2.102
CSeq: 1 ACK
Route: <sip:robot@192.168.1.234:5001>
Content-Length: 0
```

FIGURE 10

```
ACK sip:192.168.1.234:5060;transport=UDP;maddr=192.168.1.234 SIP/2.0
Via: SIP/2.0/UDP 192.168.1.234:5060;branch=z9hG4bKlf4cb1970e036f7c7d87c26a166737392
Via: SIP/2.0/UDP 192.168.2.102:5060
Record-Route: <sip:192.168.1.234:5060;transport=UDP;maddr=192.168.1.234>
From: softphone1 <sip:softphone1@192.168.2.102:5060;user=phone>
To: *92*robot <sip:robot@sipserver.mobilesrv.com:5060>;tag=2c0343a6
Call-ID: 103b0c00cccccccccccccccccccccccc@192.168.2.102
Resource-Priority: dsn.priority
CSeq: 1 ACK
Content-Length: 0
```

FIGURE 11

```
BYE sip:192.168.1.234:5060;transport=UDP;maddr=192.168.1.234 SIP/2.0
Via: SIP/2.0/UDP 192.168.1.234:5001
To: softphone1<sip:softphone1@192.168.2.102:5060;user=phone>
From: *92*robot<sip:robot@sipserver.mobilesrv.com:5060>;tag=2c0343a6
Call-ID: 103b0c00cccccccccccccccccccccccc@192.168.2.102
CSeq: 2 BYE
Max-Forwards: 70
Route: <sip:softphone1@192.168.2.102:5060>
Content-Length: 0
```

FIGURE 12

```
BYE sip:192.168.1.234:5060;transport=UDP;maddr=192.168.1.234 SIP/2.0
Via: SIP/2.0/UDP 192.168.1.234:5060;branch=z9hG4bKl7b3f7ed10682a309743433d45e4ab589
Via: SIP/2.0/UDP 192.168.1.234:5001
Route: <sip:softphone1@192.168.2.102:5060>
From: *92*robot <sip:*92*robot@sipserver.mobilesrv.com:5060>;tag=2c0343a6
To: softphone1 <sip:softphone1@192.168.2.102:5060;user=phone>
Call-ID: 103b0c00cccccccccccccccccccccccc@192.168.2.102
CSeq: 2 BYE
max-forwards: 70
Content-Length: 0
```

FIGURE 13

```
SIP/2.0 200 OK
Via: SIP/2.0/UDP 192.168.1.234:5060;branch=z9hG4bKl7b3f7ed10682a309743433d45e4ab589
Via: SIP/2.0/UDP 192.168.1.234:5001
From: *92*robot<sip:*92*robot@sipserver.mobilesrv.com:5060>;tag=2c0343a6
To: softphone1<sip:softphone1@192.168.2.102:5060;user=phone>;tag=ec6f0a00
Call-ID: 103b0c00cccccccccccccccccccccccc@192.168.2.102
CSeq: 2 BYE
Content-Length: 0
```

```
SIP/2.0 200 OK
Via: SIP/2.0/UDP 192.168.1.234:5001
From: *92*robot <sip:robot@sipserver.mobilesrv.com:5060>;tag=2c0343a6
To: softphone1 <sip:softphone1@192.168.2.102:5060;user=phone>;tag=ec6f0a00
Call-ID: 103b0c00cccccccccccccccccccccccc@192.168.2.102
CSeq: 2 BYE
Content-Length: 0
```

FIGURE 19

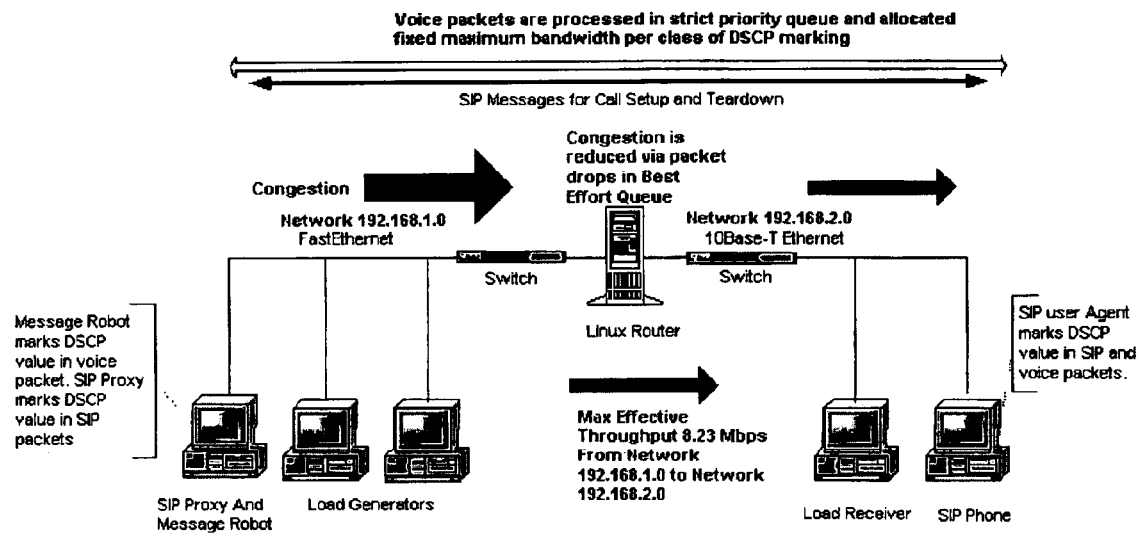

FIGURE 20

Congestion In Priority Queue

| Metric | Results |
|---|---|
| Number of Priority Packets Sent From Message Robot to MLEF Router | 3075 |
| Number of Priority packets Forwarded By MLEF Router to Caller SIP Phone | 3075 |
| Number of Priority Packets Dropped By MLEF Router | 0 |
| Number of Routine Packets Sent From Load Generators (congestion) to MLEF Router | 388216 |
| Number of Routine Packets Forwarded By MLEF Router to Load Receiver | 274392 |
| Number of Routine Packets Dropped by MLEF Router | 113824 |
| Percentage Drop of Routine Packets | 29.32% |

MULTI-LEVEL EXPEDITED FORWARDING PER HOP BEHAVIOR

CROSS REFERENCE TO RELATED APPLICATION

This application is based upon and claims benefit of copending and co-owned U.S. Provisional Patent Application Ser. No. 60/442,423 entitled "Multi-Level Expedited Forwarding Per Hop Behavior", filed with the U.S. Patent and Trademark Office on Jan. 24, 2003 by the inventors herein, the specification of which is incorporated herein by reference.

GOVERNMENT CONTRACT

This invention was made in part with United States Government support under Small Business Innovative Research (SBIR) Air Force 99-113, and the United States Government may have certain rights to the invention.

BACKGROUND OF THE INVENTION

1. Field of the Invention

The present invention relates to telecommunications technologies, and more particularly to a method and system for supporting multiple levels of priority for voice or other types of traffic over a telecommunications network.

2. Background of the Art

Live voice communication is carried out over the Internet, and may thus be carried out over other wide area networks, local area networks, or other distributed networks, pursuant to Voice over Internet Protocol, or "VoIP." In using VoIP, a person's speech is digitized and transmitted in Internet Protocol ("IP") packets from one VoIP phone to a second VoIP phone. This may be implemented as a regular phone attached to an adaptor that converts analog signal to VoIP. The caller's speech to the recipient is transmitted in one stream of packets, and the recipient's speech is transmitted to the caller in a second stream of packets. Similarly, call setup and teardown control signals are sent and received in IP packets.

Currently, VoIP speech and call control packets are transmitted in accordance with the User Datagram Protocol (UDP), a communications protocol that offers a limited amount of service when messages are exchanged between computers in a network that uses IP, but that does not provide sequencing of the packets that the data arrives in. UDP sends a packet from one IP address to a destination IP address and assumes the packet will arrive at the destination. UDP does not have guaranteed delivery of packets as the more commonly known Transmission Control Protocol (TCP).

Under VoIP, voice packets between the caller and recipient are forwarded in the network by routers. A router may drop a packet or introduce uneven delays due to network congestion. Routers do not automatically re-route traffic to avoid congestion. As a result, a network router can drop call control or voice packets in VoIP phone calls. The effects of dropped VoIP packets can prevent the establishment of VoIP calls or cause garbled speech being delivered to one of the parties in a phone call.

To avoid such congestion and to enable live voice communication to be successfully carried out over a wide area network, VoIP packets may be processed in a separate priority queue that the routers process first. Differentiated Services (also referred to as "DiffServ" or "DS") offers a protocol that specifies and controls network traffic so that certain types of traffic get precedence. For example, in a network transmitting both voice and other data, voice data (which requires continuous, uninterrupted transmission) may take precedence over other kinds of data that are not sensitive to temporal interruptions in their transmission. Such other types of data packets (e.g., ftp, http, video, etc.) are thus processed in a separate queue commonly referred to as the best effort queue. In order to provide the voice data packets with such differentiated service, the IP header of each voice data packet contains a Type of Service (ToS) byte, a portion of which is used to store a Differentiated Services Code Point (DSCP), a six bit value that specifies a particular "per hop behavior" (PHB) for the data packet, i.e., a predefined forwarding behavior for the data packet.

One such PHB has come to be known as the expedited forwarding per hop behavior (EF PHB), as described in Davie, B. et al., "An Expedited Forwarding PHB (Per-Hop Behavior)", RFC 3246 (The Internet Society, March 2002), which is incorporated herein in its entirety by reference thereto. The EF PHB provides low loss, low delay, and low jitter VoIP services. The intent of the EF PHB is to provide a PHB in which packets marked for EF PHB ordinarily encounter short or empty queues, and maintain packet loss at a minimum by keeping the queues short relative to the available buffer space. Unfortunately, however, the EF PHB defines only one level of precedence and does not support multiple levels of precedence within the PHB. Thus, there currently exists a need for a multiple precedence level scheme to be applied to the EF PHB.

For example, during an emergency, such as a terrorist attack, severe weather, or other large-scale social calamity, there may be many people trying to make phone calls. With a VoIP telephone system, the increased volume of voice packets could exceed the bandwidth allocated by a router for VoIP. The result can lead to people being unable to place phone calls, or degrade existing calls to the extent that speech becomes unintelligible. If first-responders to an emergency are unable to establish critical communications, the results can be loss of life or significant loss of property.

As the commercial telephone sector is migrating toward a Packet Switching model rather than the Circuit Switching voice infrastructure that has been in use for many decades, the need is urgent to provide a VoIP system that will allow for such precedence based discrimination for voice traffic that is to be subjected to expedited forwarding.

SUMMARY OF THE INVENTION

The present invention provides a method and apparatus for providing users preference in establishing and conducting VoIP calls by: (i) assigning precedence (a classmark) to calls which may be done by modifying the dialing plan; (ii) marking the actual data packets carrying the calls so that they can receive special treatment; and (iii) giving right of way to the marked data packets in the routers of the distributed telecommunications system. One feature of this invention is the monitoring of the current size (the number of packets in the queue) of the priority output queue for each line. If the current queue size exceeds a preset limit for any traffic class, traffic in that class (or any lower class) is immediately dropped, thus saving space for higher precedence traffic. Each higher traffic class is allowed a larger percentage of the maximum queue size than lower traffic classes.

To accomplish such multi-level discrimination among expedited forwarding traffic, the method and system of the invention utilize a multi-level expedited forwarding per hop behavior (MLEF PHB) that manages buffer space to provide right of way to calls based on a predefined precedence scheme. The MLEF PHB defines a set of configurable parameters that define how much buffer space is available to each class or level of voice call. In a first exemplary embodiment of the invention, the MLEF PHB is implemented as programming statements in the kernel of a LINUX-based PC router. However, the PHB is independent of the particular router implementation, so the MLEF PHB can be applied to any router. Likewise, the PHB may optionally be implemented as software, in an application specific integrated circuit (ASIC), or as programmed logic modules. There are various electronic devices of this type. The MLEF PHB applies an algorithm for dropping packets exceeding a caller precedence level-specific buffer capacity, which variable buffer capacity is determined by the particular DSCP of the packet and the configuration of the router.

BRIEF DESCRIPTION OF THE DRAWINGS

Other objects, features, and advantages of the present invention will become more apparent from the following detailed description of the preferred embodiment and certain modifications thereof when taken together with the accompanying drawings, in which:

FIG. 1 is a table of address prefixes with associated precedence values according to the present invention;

FIG. 3 shows an example of an INVITE message sent from a caller user agent server to a proxy server;

FIG. 4 shows an example of an INVITE message sent from the proxy server to a receiver user agent server;

FIG. 5 shows an example of a RINGING message sent from the receiver user agent server to the proxy server;

FIG. 6 shows an example of a RINGING message sent from the proxy server to the caller user agent server;

FIG. 7 shows an example of a 200 OK response message sent from the receiver user agent server to the proxy server;

FIG. 8 shows an example of a 200 OK response message sent from the proxy server to the caller user agent server;

FIG. 9 shows an example of an ACK message sent from a caller user agent server to a proxy server;

FIG. 10 shows an example of an ACK message sent from the proxy server to a receiver user agent server;

FIG. 11 shows an example of a BYE message sent from the receiver user agent server to the proxy server;

FIG. 12 shows an example of a BYE message sent from the proxy server to the caller user agent server;

FIG. 13 shows an example of a 200 OK message sent from a caller user agent server to a proxy server;

FIG. 18 is a table of Type of Service values with maximum queue size for associated precedence levels;

FIG. 19 shows an exemplary hardware system employing an embodiment of the present invention; and FIG. 20 is an exemplary table of results from employing the present invention to resolve congestion in a priority queue.

DETAILED DESCRIPTION OF THE PREFERRED EMBODIMENT

Figure 2:
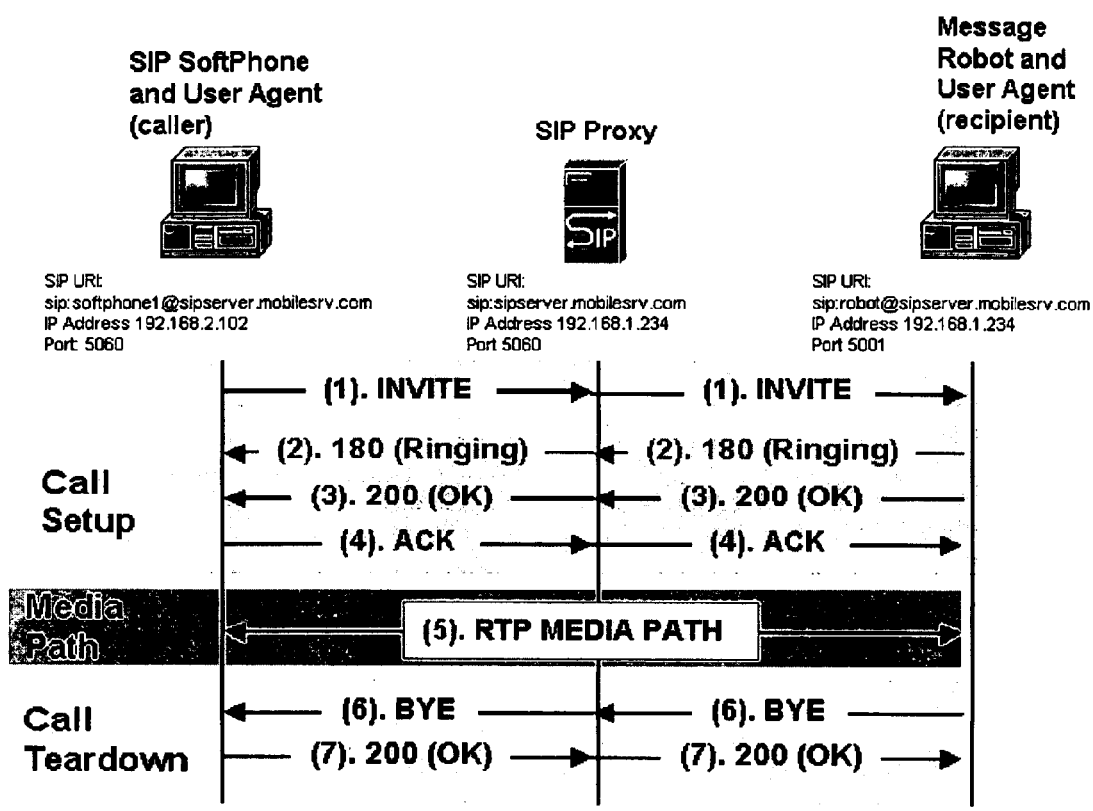
FIG. 2 is a schematic view of steps to execute a VoIP phone call according to one embodiment of the present invention.

The invention summarized above and defined by the enumerated claims may be better understood by referring to the following description, which should be read in conjunction with the accompanying drawings in which like reference numerals are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiment disclosed as a basis for modifying or designing other methods and systems for carrying out the same purposes of the present invention. Those skilled in the art should also realize that such equivalent assemblies do not depart from the spirit and scope of the invention in its broadest form.

One aspect of the system and method of the instant invention is the MLEF PHB that manages buffer space to provide right of way to high priority call traffic on a distributed network. The MLEF PHB defines a set of configurable parameters that define how much buffer space is available to each class of voice call within the low latency queue in a router. A configuration/initialization procedure calculates the maximum count in the buffer for each traffic class (MaxClassCnt (i)). This value is the maximum buffer percentage, i.e., the percentage of the buffer that may be consumed by a particular class before packets begin to be dropped, times the buffer size. A maximum packet size may also be specified as part of the configuration. Using the standard G.711 voice encoding for VoIP, the bit rate is 64 kbps. At 50 packets/sec, each packet contains 160 bytes (1280 bits) of voice data. Each voice packet has 40 bytes of overhead for the UDP, RTP, and IP headers. The maximum voice packet size is therefore 200 bytes per packet (1600 bits) using the G.711 codec. (Secure voice would require a larger maximum packet size since a copy of the IP header is encrypted to forestall certain attacks.) Once a maximum packet size is set, the, buffer size for a line may be determined as follows:

1. For a T1 line: (1.536 Mbps)*(0.75)*(0.05 sec delay/pkt)/(1600 bits/pkt)=36 packet buffer.

2. For an Ethernet link: 10 Mbps*0.75*0.05 sec/1600 bits/pkt=200 packet buffer.

The factor of 0.75 is used to reserve 25% of the bandwidth for other flows and routing overhead. The factor of 0.05 seconds has been chosen as a reasonable maximum additional delay for one hop on the path of a voice packet. (The ITU standard for total latency of a voice packet is 150 ms.)

As each packet is received by the router (or other component serving to buffer and transmit the packet), any packet that is larger than the maximum packet size is dropped. The current Buffer Occupancy Count (BOC), expressed as a number of packets (this is the number of packets in the priority queue), is then checked against the threshold limit for the particular class (MaxClassCnt(i)) and, if the BOC is less than the limit, the packet is enqueued on the MLEF output queue. If the BOC is greater than or equal to this limit, the packet is discarded.

It should be noted that all processing for the variable buffer management scheme may optionally be performed at the byte level rather than at the packet level.

The following description sets forth an implementation of the MLEF PHB as described above. First, an administrator must determine the number of classes in the system, assign a single DSCP to each class, and determine the percentage of the buffer reserved for MLEF PHB traffic that is to be used for each class and all traffic in a higher class (BP(i), where "i" is the index value for the particular traffic class). The administrator must then set the maximum packet size (MaxPacketSize) for all packets using the MLEF PHB, the total size of the buffer in a router that is to be reserved for MLEF PHB traffic (MaxPacketCnt, calculated by the output bandwidth of the router times 0.75 to leave a portion of the bandwidth available for router control), and, for each class, the maximum number of packets that may be buffered for each class of traffic (MaxClassCnt(i), calculated by Max-PacketCnt times BP(i) rounded up to an integer). For each incoming VoIP packet, the packet size is first compared to the MaxPacketSize and, if the packet size of the incoming packet is greater than the MaxPacketSize, such packet is discarded. Otherwise, the Buffer Occupancy Count ("BOC," measured as the number of packets of MLEF PHB traffic in the buffer) is determined and compared to MaxClassCnt(i). If the BOC is greater than or equal to the MaxClassCnt(i) for the class to which the particular packet belongs, then the packet is discarded. Otherwise, if the BOC is less than the MaxClassCnt(i) for the class to which the particular packet belongs, then the packet is enqueued and the BOC value is incremented. In forwarding the MLEF PHB traffic, the buffer dequeues each packet on a first-in first-out (FIFO) basis, transmits each packet, and decrements the BOC value.

The above-described MLEF PHB may be implemented as programming statements or hardware components in the output interface of a router. The following discussion sets forth an exemplary embodiment of a system implementing the MLEF PHB.

First, call control is implemented through SIP (Session Initiation Protocol). When a high priority user initiates a call, some way is needed to notify the network of the call's precedence. Including the call precedence requires an additional feature in the call control protocol. A Resource-Priority header field is thus added to the SIP message that identifies the precedence of the phone call and is used by the SIP Proxy and user agents to determine the call precedence and to set the Type of Service (ToS) value in call control and voice packets. A Resource-Priority header is necessary because the application program interface (API) for network sockets does not allow developers to determine the ToS value of an incoming packet. Without the Resource-Priority header, a developer would need to use kernel-level functions to determine the precedence of an incoming packet. Inclusion of the call precedence value thus allows the SIP Proxy and user agents to assign the corresponding DSCP value to call control and voice packets.

The caller designates the precedence of the SIP phone call by issuing a prefix to the recipient's SIP address. The SIP user agent identifies the call precedence from the given SIP address prefix, adds the Resource-Priority header for the call precedence to the SIP message, and sets the DSCP value, indicative of the ToS, for the call precedence in the SIP packet. During the phone conversation, the caller's and recipient's SIP phones set the DSCP value for the call precedence in the voice packets. Setting the DSCP value in the call control and voice packets is necessary for the router to prioritize the packets. In an exemplary embodiment of the system of the invention, open source components may be used to build the SIP user agents, softphone, and SIP Proxy to implement the MLEF algorithm. The SIP agent provided in the exemplary embodiment of the system of the invention described herein may be a VoIP telephone. The SIP user agent sends SIP request and response messages to other user agents or to SIP proxies. A SIP proxy receives SIP messages from user agents and forwards the SIP messages to the destination SIP user agent. A common use of a SIP Proxy is to serve as a locator server. In the exemplary embodiment described herein, the SIP Proxy is programmed to maintain state of the VoIP call in order to mark the Type of Service for the call control packets.

In order to initiate a telephone call using SIP, the caller dials the SIP address of the recipient. A SIP address is a uniform resource identifier (URI) with the format of SIP:<destination user name>@<destination host><destination domain name>:<Port number>. If a port number is not part of the URI, the port number is set at a default value of 5060. For example, SIP:sally@sipserver.sallydomain.com would be the SIP address for a SIP phone with the user name "sally" at SIP Proxy sipserver.sallydomain.com. The SIP Proxy will be listening for messages on port 5060. In order for the caller to designate the call precedence, a prefix is added to the recipient's username. The caller's user agent identifies the call precedence in the destination SIP address. The caller's user agent then builds the SIP request message. When the SIP user agent transmits the SIP request, the user agent sets the Differentiated Services field in the ToS byte of the packet to the respective value for the call precedence (This field is typically referred to as the Differentiated Services Code Point, DSCP). The SIP Proxy receives the SIP request, and forwards the request to the destination user agent with the message ToS value set to the call precedence. Responses from the recipient's user agent are sent to the caller via the SIP Proxy.

Of course, the above call setup process is exemplary only, and in fact, call setup may be carried out through alternate protocols, such as H.323 or MGCP, without departing from the spirit and scope of the invention.

FIG. 1 depicts an exemplary table correlating the SIP call prefix, Resource-Priority header value, call precedence, DiffServ value, and ToS byte value. The DiffServ value comprises the first six bits of the ToS byte and is referred to herein as the DSCP value. Of course, the values provided in the table of FIG. 1 may be assigned as the administrator deems appropriate. However, of note is the fact that a different SIP Call Prefix is assigned to each distinct Call Precedence, and associated with each distinct SIP Call Prefix is a unique DSCP Value that sets the particular MLEF PHB to be applied to packets transmitted during the call. The API for network sockets allows developers to directly set the ToS byte, which includes the DiffServ field. In the exemplary embodiment described herein, Differentiated Services is used in implementing MLEF, and the ToS byte value is used to set the precedence value of a packet using the network socket API.

FIG. 2 is a schematic view of the steps taken by a caller using a SIP softphone to call a recipient. As depicted in FIG. 2, the recipient is denoted as a "message robot" which is configured to stream a pre-recorded message to the caller. It should be noted, however, that such configuration was implemented for testing purposes only, and that, in practice, the caller may be any recipient equipped with any VoIP phone capable of communicating with the user agent and SIP proxy to transfer VoIP data between the user agent and the recipient, whether they are located on the same or an entirely disparate network, and if the SIP user agent marks the ToS value in packets in accordance with the call precedence level. The user agent identifies the call precedence level in outgoing calls by matching the call precedence level pattern in the recipient's URI. The SIP user agent identifies the call precedence level in incoming calls using the value of the Resource-Priority header in the incoming SIP call setup messages. Of course, as mentioned above, protocols other than SIP (such as H.323 and MGCP) may likewise be used to setup the call.

At step (1) of the exemplary embodiment, both the caller and the recipient have registered with the SIP Proxy. The caller's User Agent sends an INVITE message to the SIP Proxy. The INVITE message contains the parameters necessary to conduct a voice conversation such as the caller's transport protocol, IP address, port number, and available coder-decoders (codecs). The SIP Proxy determines that it has the IP address and port of the recipient's User Agent and forwards the INVITE to the recipient's User Agent.

To further illustrate the concepts set forth herein, and by way of example only, SIP messages for a telephone call with a precedence level of Priority will be shown flowing from the softphone 1 to the message robot recipient through the SIP Proxy, as shown in FIG. 2. To make a Priority call, the caller enters the recipient's SIP URI preceded by '*92*' to indicate that this will be a Priority call, as follows: sip:*92*robot@sipserver.mobilesrv.com:5060. The caller's user agent then sets the INVITE packet ToS value to 180 (FIG. 1) and sends the message to the SIP Proxy at IP address 192.168.1.234 and port 5060. The SIP message from the caller's user agent to the SIP Proxy is shown in FIG. 3.

The SIP Proxy receives the INVITE message from the caller and identifies that the caller is requesting a Priority precedence from the prefix in the recipient's URI. The SIP Proxy adds a Resource Priority header with the value of "dsn.priority" to the INVITE message, establishes the Type of Service by setting the DiffServ value to 45, and sends the INVITE request to the recipient at 192.168.1.234 and port 5001. The INVITE message sent to the message robot is shown in FIG. 4.

At step 2, the recipient's User Agent begins alerting the recipient of the incoming call and returns a "180 Ringing" response to the caller's User Agent. In the exemplary construction depicted in FIG. 2, the recipient is a message robot and immediately sends the "180 Ringing" response upon receipt of the INVITE request. For purposes of this example, the message robot's User Agent sent the response message depicted in FIG. 5 to the SIP Proxy at IP address 192.168.1.234 and port 5060 with the packet DSCP value set to 45. (This equates to the ToS byte value of 180.)

The SIP Proxy sets the DSCP value to 45 for a Priority packet and forwards the "180 Ringing" response to the caller's user agent at 192.168.1.102 and port 5060 as shown in FIG. 6.

At step 3, when the recipient accepts the call, the recipient's User Agent returns a "200 OK" response with the IP address and port number to send the Real Time Protocol (RTP) voice packets to. In the exemplary embodiment described herein, the recipient immediately accepts the call and sends the "200 OK" response to the SIP Proxy. For purposes of this example, the recipient's User Agent sends the "200 OK" response message shown in FIG. 7 to the SIP Proxy at IP address 192.168.1.234 and port 5060 with the packet DSCP value set to 45.

The SIP Proxy sets the DSCP value to 45 for a Priority packet and forwards the "200 OK" response to the caller's user agent at 192.168.2.102 and port 5060 as shown in FIG. 8.

At step 4, when the caller's User Agent receives the "200 OK" from the recipient, the caller sends an ACK message to the recipient. ACK is used to acknowledge the reception of a final response to an INVITE. For purposes of this exemplary embodiment, the caller's user agent sets the ACK packet DSCP value to 45 and sends this message to the SIP Proxy at IP address 192.168.1.234 and port 5060. The ACK message from the caller's user agent to the SIP Proxy is shown in FIG. 9.

The SIP Proxy then receives the ACK message from the caller and identifies that the caller is requesting a Priority precedence from the prefix in the recipient's URI. The SIP Proxy adds a Resource Priority header with the value of "dsn.priority" to the ACK message, sets the DSCP value to 45, and sends the ACK response to the recipient. The ACK message sent to the recipient is displayed in FIG. 10.

At step 5, the caller and recipient conduct their phone conversation. In the exemplary embodiment described herein, all the voice packets have their DSCP value set to the precedence of the call requested in the INVITE message. The message robot recipient, in this example, streamed a pre-recorded voice message using the Real Time Protocol (RTP) to the calling VoIP phone. For this example, the caller's and message robot RTP functions set the DSCP value of the voice packets to 45 for Priority precedence.

At step 6, the voice conversation has ended and the recipient terminates the connection. The recipient's User Agent sends a BYE message to the caller. For purposes of this example, the message robot's user agent sent the BYE message displayed in FIG. 11 to the SIP Proxy at IP address 192.168.1.234 and port 5060 with the packet DSCP value set to 45.

The SIP Proxy then sets the DSCP value to 45 for a priority packet and forwards the BYE message to the caller's user agent at 192.168.1.102 and port 5060 as shown in FIG. 12.

At step 7, the caller's User Agent sends a "200 OK" response to the recipient (message robot) to acknowledge the call has ended. For purposes of this example, the caller's user agent set the "200 OK" packet DSCP value to 45 and sent this message to the SIP Proxy at IP address 192.168.1.234 and port 5060. The "200 OK" message from the caller's user agent to the SIP Proxy is shown in FIG. 13.

Figures 14, 15:
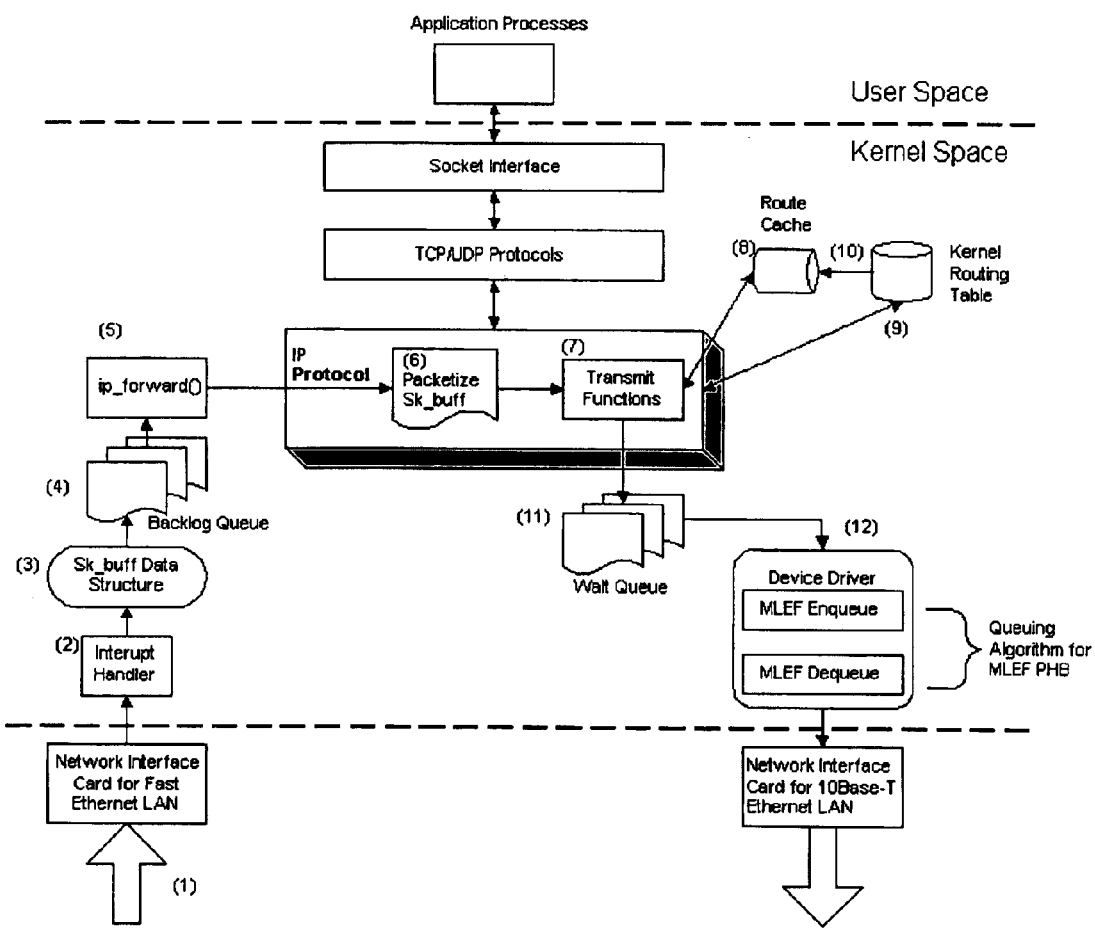
FIG. 14 shows an example of a 200 OK message sent from the proxy server to a receiver user agent server.
FIG. 15 is a flowchart illustrating the process to receive and forward a VoIP packet according to one embodiment of the present invention.

The SIP Proxy then sets the DSCP value to 45 for a Priority packet and forwards the "200 OK" response to the message robot at 192.168.1.234 and port 5001 as shown in FIG. 14.

An exemplary embodiment of the system of the instant invention may employ Linux traffic control to implement the MLEF PHB. The Linux 2.4.x kernel supports many routing and packet classifying functions. A personal computer may be used with two Ethernet network interface cards (NIC) as a Linux router to route packets between two local area networks (LANs). One NIC supports FastEthernet and the second NIC implements 10 Mbps 10Base-T Ethernet. Again, such configuration is exemplary only of a system implementing the invention, as the MLEF PHB is operating system independent and may, in fact, be deployed in any router.

Figure 16:
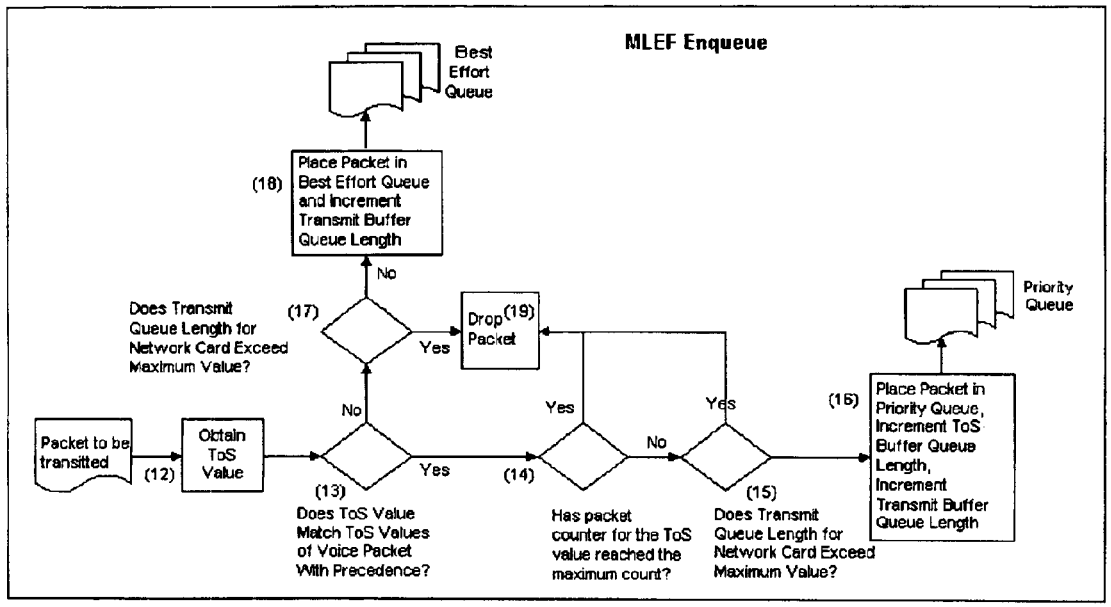
FIG. 16 is a flowchart illustrating the process to enqueue data packets according to the present invention.
Figure 17:
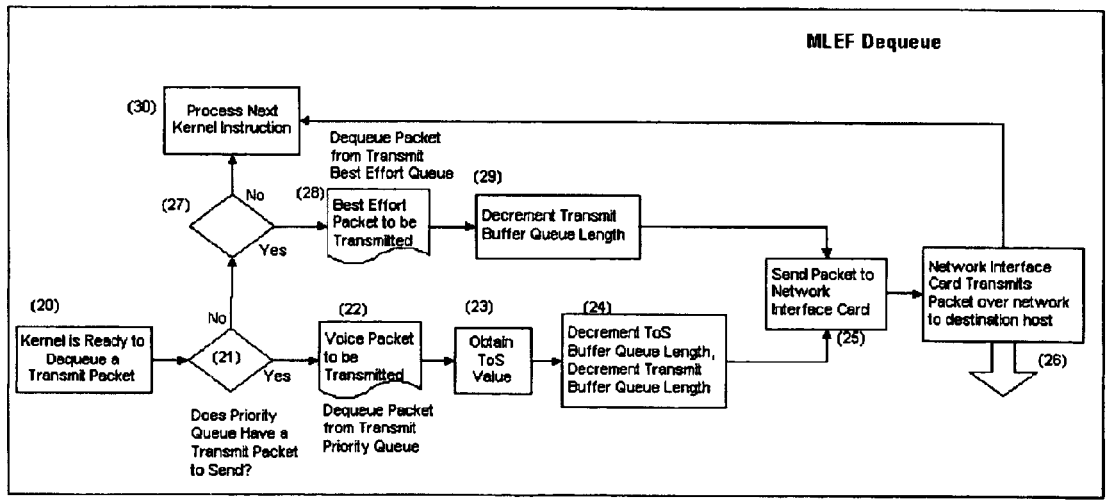
FIG. 17 is a flowchart illustrating the process to dequeue data packets according to the present invention.

FIGS. 15, 16, and 17 illustrate how the kernel receives and forwards TCP/IP packets. These are steps taken by the kernel to receive an incoming packet and route it to the destination host:

(1) A packet arrives at the network interface card.

(2) The network interface card triggers an interrupt.

(3) The kernel creates a sk_buff data structure to receive the incoming packet from the network interface card.

(4) The kernel adds the sk_buff packet to the backlog queue. There is only one backlog queue for the system. If the backlog queue reaches maximum capacity, newly arriving packets will be dropped.

(5) The ip_forward( ) function is called and checks if the packet's time-to-live (i.e., the number of router hops the packet can traverse before a packet is discarded, marked in the packet by the sending computer) has expired. If the time-to-live value expires, the packet is discarded.

(6) A new packet is constructed, consisting of the contents of the old packet. If the incoming packet is a fragment, it is placed in a queue waiting for assembly. When all fragments have been received, they are combined into a single sk_buff data structure. There is a timer for this assembly. If the timer expires, then the packet is marked as lost.

(7) The kernel IP layer calls the IP routing functions to determine which route to be taken. This information includes the source IP address, the network device data structure, maximum message size, a reference count, a usage count, and a last usage timestamp.

(8) When an IP route is looked up, the route cache is first checked for a matching route.

(9) If a route is not found in the route cache, the kernel's routing table is queried.

(10) If the next route is found in the kernel's routing table, the route cache is updated.

(11) The ip_queue_xmit function is called to place the outgoing packet in the wait queue.

(12) The network device driver is activated for transmission. The queuing algorithm for a network interface card determines if the packet should be transmitted, held in the queuing discipline's queue, or dropped.

The MLEF enqueuing operations are illustrated in FIG. 16. The MLEF code determines the Type of Service to be used from the packet, by checking the DSCP. The DSCP comes from the DiffServ value, which is part of the ToS byte.

(13) First, the packet is checked to determine if it should be given a particular Type of Service. Identification of a packet as a voice call with precedence is determined by matching the packet's DiffServ value with preset DiffServ values for each precedence level. The DiffServ values for each call precedence are shown in the table of FIG. 18. If the incoming packet has a DiffServ value that matches the DiffServ value that has been assigned for a call precedence, the packet is evaluated to be queued in the priority queue. Otherwise, the packet will be queued in the best effort queue.

(14) The MLEF algorithm is implemented within the priority queue for the transmit functions of the network interface card. There is one priority queue and there can be multiple other non-priority queues in the transmit functions of the router network interface. For purposes of illustration only, the exemplary queues described herein are the priority queue and the best effort queue. The priority queue is always dequeued before the best effort queue. The number of packets in the MLEF queue cannot exceed the maximum transmit queue length (set to 100 during testing).

In MLEF, within the priority queue, each call precedence has a maximum number of packets that can be queued as shown in the table of FIG. 18. If a call packet arrives and the number of packets for the respective Type of Service, as determined by its DiffServ value, is at maximum, the incoming packet is dropped.

(15) After the incoming packet is identified for the priority queue, the kernel evaluates if the maximum transmit queue length has been reached. If so, the incoming packet is dropped.

(16) If the maximum transmit queue length has not been reached, the voice packet is enqueued in the priority queue. The number of packets within the priority queue is incremented and the number of packets within the transmit queue is incremented.

(17) If the incoming packet did not have a DSCP value indicating that the packet should have the Type of Service that has been assigned for the priority queue, the packet will be sent to the best effort queue. If the transmit queue occupancy for the particular network card reaches the maximum value, the packet is dropped. Otherwise, the packet will be queued in the best effort queue.

(18) The packet is queued in the best effort queue (which is dequeued if the priority queue is empty). The number of packets in the transmit queue is incremented.

(19) A packet is dropped if the transmit queue occupancy reaches the maximum value. In addition, a voice packet designated for the priority queue is dropped if the queue size for its DSCP exceeds the preset maximum value. Since call precedences of higher importance have a larger maximum queue size, packets of lower precedence calls will be dropped before packets of higher precedence.

(20) When the kernel is ready to dequeue a packet and transmit the queued packets, the events in FIG. 17 occur. In the system used for testing, all the packets in the transmit buffer queues may not be transmitted before more packets are added to the transmit buffer, due to the interrupt nature of the test system.

(21) The priority queue is checked first for any packets to transmit.

(22) If the priority queue does have a packet, the packet is dequeued from the priority transmit queue. In the exemplary embodiment described herein, the packets may be dequeued in First In First Out (FIFO) order.

(23) The ToS value is obtained from the packet to be dequeued. Since the entire transmit buffer may not be emptied, the system keeps track of the priority transmit queue length for each precedence level, separately.

(24) The priority queue length for the packet's ToS value is decremented. The transmit queue length is decremented.

(25) The packet to be transmitted is sent to the network interface card.

(26) The network interface card transmits the packet to the destination host over the physical media (e.g., an Ethernet cable).

(27) If the priority queue is empty when the kernel is ready to transmit a packet, the best effort queue is checked for packets to be sent.

(28) The packet is dequeued from the best effort queue.

(29) The transmit buffer queue length is decremented and the packet is sent to the network interface card for transmission.

(30) The kernel continues processing.

An exemplary hardware system employing the instant invention is shown in FIG. 19, and comprises a Linux router configured to send packets to a receiving application in a 10Base-T Ethernet LAN. The MLEF algorithm was implemented in the Linux kernel for the output of the 10Base-T Ethernet card. This configuration simulated a SIP phone call on a congested network via the MLEF Linux router between the local area networks. The SIP user agents participating in the phone call operated on separate computers from the computers congesting the network.

The Fast Ethernet interface on the MLEF Linux router served as a gateway for an isolated local area network (LAN). The FastEthernet LAN serviced three Linux workstations. Two workstations served as network load generator and the third workstation operated as a Session Initiation Protocol (SIP) Proxy and message robot.

The SIP Proxy was an open source SIP Proxy project that was modified to parse the precedence of the SIP call from the SIP request message. The SIP Proxy marked the Type of Service (ToS) value on SIP responses sent to the message robot and to the calling SIP user agent corresponding to the precedence of the SIP call request message from the calling user agent.

The message robot receiver consisted of an open source SIP user agent that streamed a pre-recorded message to the SIP user agent that called the message robot. The message robot set the Type of Service (ToS) byte on the packets corresponding to the precedence requested from the calling SIP user agent. Using a set voice message to stream to the calling SIP user agent served as a reference for comparing the effects of network congestion on the quality of speech in the phone call.

The load generator computer congested the network by creating multiple User Datagram Protocol (UDP) streams and transmitting them to the load receiver computer. The UDP streams consisted of streaming 200-byte packets at 1000 packets per second to separate destination ports on the load-receiving computer. The load receiver computer connected to the 10Base-T LAN.

The 10Base-T network interface in the MLEF Linux router served as the gateway for the load receiver computer and a SIP user agent. The SIP user agent provided call signaling for a VoIP softphone. The SIP user agent and VoIP softphone were bundled together in an open source project. The SIP user agent was modified to set the ToS value in SIP messages corresponding to the precedence of the call.

The load-receiving computer operated a UDP listening application to receive the UDP packets sent by the load generator computer.

The SIP Phone used G.711 coder-decoder (codec) for VoIP calls with a 20 ms sampling time, generating 50 packets per second. G.711 uses 64 kb/s. Each packet contains UDP, RTP, and an IP header, a 40-byte header. Forty bytes times fifty packets per second yields 16 kb/s in packet overhead. This results in a data stream of 80 kb/s with no silence suppression.

Measurements were taken of the number of packets for each call precedence that were received, transmitted, and dropped by the MLEF code within the packet forwarding processes of the 10Base-T network interface card in the Linux router. The measurements demonstrated that during network congestion, voice packets of higher precedence were not dropped while voice packets of lower precedence were dropped. This is the desired behavior for a router to ensure that high priority VoIP calls can be successfully established with call control packets and voice conversation is intelligible. The table depicted in FIG. 20 contains metrics indicating the level of congestion caused by a higher volume of routine voice packets traversing the router while a phone call is established with a Priority precedence.

While the above description of an exemplary embodiment of a hardware system incorporating the invention particularly notes the use of a Linux router, it should be noted that routers provided with alternate operating systems may likewise be used (e.g., UNIX, a specialized operating system built for real-time communications, etc.) without departing from the spirit and scope of the invention. In order to implement the MLEF PHB in such alternate routers, code is inserted into the router operating system to implement the functions set forth above. The MLEF PHB may likewise be implemented in WINDOWS by coding the MLEF process in the network driver software for the Ethernet card.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method for passing information over a communication network, comprising the steps of:

determining the buffer size for transmitting said information over the communication network;

determining a plurality of precedence levels for at least a portion of said information passing over said communication network;

assigning a percentage of said buffer to each of said precedence levels, wherein the sum of said percentages may exceed 100%;

receiving information, said information including data having an indication of the precedence for transmitting said information;

evaluating said received data against said plurality of precedence levels; and if said indication of precedence of said received information matches one of said plurality of precedence levels, passing said information for processing in a priority buffer queue; and if said indication of precedence of said received information does not match one of said plurality of precedence levels, passing said information for processing in at least one other output queue; and transmitting any information in said priority queue before transmitting any information in said at least one other output buffer queue.

2. The method of claim 1, wherein the step of processing said information in a priority buffer queue further comprises the steps of:

determining if said buffer includes information having said precedence level up to the percentage of said buffer assigned to the precedence of said information;

if the percentage of said buffer assigned to the precedence of said information has been filled, discarding said information;

if the percentage of said buffer assigned to the precedence of said information has not been filled, determining if the buffer is full;

if the buffer is full, discarding said information; and if the buffer is not full, adding said information to a priority output queue for transmission.

3. The method of claim 1, wherein the step of processing said information in at least one other output buffer queue further comprises the steps of:

determining if said buffer is full;

if the buffer is full, discarding said information; and;

if the buffer is not full, adding said information to a non-priority output queue for transmission.

4. The method of claim 1, wherein a larger percentage of said buffer is assigned to information with a higher precedence level.

5. The method of claim 1, wherein such communication network is a packet based network.

6. The method of claim 5, further comprising the steps of:

determining a maximum packet size; and if the packet of received information exceeds the maximum packet size, discarding the packet.

7. The method of claim 5, wherein said information is transmitted in data packets and each data packet includes a packet header.

8. The method of claim 7, wherein the data having an indication of the precedence for transmitting said information is included in a field in said packet header.

9. The method of claim 8, wherein said field comprises a Type of Service field and said indication of precedence comprises a Differentiated Services Code Point within said Type of Service field.

10. A method for passing information over a packet based communication network, comprising the steps of:

determining a maximum packet size;

determining the buffer size for transmitting said information over the communication network;

determining a plurality of precedence levels for at least a portion of said information passing over said communication network;

assigning a percentage of said buffer to each of said precedence levels, wherein the sum of said percentages may exceed 100%;

receiving an information packet, said packet having a label indicating the precedence for transmitting said information;

if the received information packet exceeds the maximum packet size, discarding the packet, otherwise transmitting any information packet in said priority queue before transmitting any information packet in said at least one other output queue examining the label on said packet to determine the precedence level of said packet;

evaluating said label against said plurality of precedence levels; and if the precedence of said packet matches one of said plurality of precedence levels, passing said packet for processing in a priority buffer queue; and if the precedence of said packet does not match one of said plurality of precedence levels, passing said packet for processing in at least one other output queue.

11. The method of claim 10, wherein the step of processing said packet in a priority buffer queue further comprises the steps of:

determining if said buffer includes packets having said precedence level up to the percentage of said buffer assigned to the precedence of said packet;

if the percentage of said buffer assigned to the precedence of said information has been filled; discarding said packet;

if the percentage of said buffer assigned to the precedence of said information has not been filled, determining if the buffer is full;

if the buffer is full, discarding said packet; and if the buffer is not full, adding said packet to a priority output queue for transmission.

12. The method of claim 10, wherein the step of processing said packet in at least one other output buffer queue further comprises the steps of:

determining if said buffer is full;

if the buffer is full, discarding said packet; and;

if the buffer is not full, adding said packet to a non-priority output queue for transmission.

13. The method of claim 10, further comprising the steps of:

transmitting the packets from the priority buffer queue before transmitting the packets for the other output queue.

14. The method of claim 10, wherein said information packet includes a packet header and said label is included in a field in said packet header.

15. The method of claim 14, wherein said field comprises a Type of Service field and said label comprises a Differentiated Services Code Point within said Type of Service field.

16. The method of claim 10, wherein a larger percentage of said buffer is assigned to information with a higher precedence level.

17. A computer readable medium containing executable program instructions for use in passing information over a communication network, the network comprising transmission buffers, wherein a percentage of said buffer is assigned to each of a plurality of predetermined precedence levels, the executable program instructions comprising program instructions for:

receiving information, said information including data having an indication of the precedence for transmitting said information;

evaluating said received data against said plurality of precedence levels; and if said indication of precedence of said received information matches one of said plurality of precedence levels, passing said information for processing in a priority buffer queue; and if said indication of precedence of said received information does not match one of said plurality of precedence levels, passing said information for processing in at least one other output queue; and transmitting any information in said priority queue before transmitting any information in said at least one other output buffer queue.

18. The computer readable medium of claim 17 further comprising program instructions for the step of processing said information in a priority buffer queue, said instructions comprising:

determining if said buffer includes information having said precedence level up to the percentage of said buffer assigned to the precedence of said information;

if the percentage of said buffer assigned to the precedence of said information has been filled, discarding said information;
if the percentage of said buffer assigned to the precedence of said information has not been filled, determining if the buffer is full;
if the buffer is full, discarding said information; and
if the buffer is not full, adding said information to a priority output queue for transmission.

19. The computer readable medium of claim 17 further comprising program instructions for the step of processing said information at least one other output buffer queue, said instructions comprising:
determining if said buffer is full;
if the buffer is full, discarding said information; and;
if the buffer is not full, adding said information to a non-priority output queue for transmission.

20. A server for passing information over a communication network, comprising:
means for determining the buffer size for transmitting said information over the communication network;
means for determining a plurality of precedence levels for at least a portion of said information passing over said communication network;
means for assigning a percentage of said buffer to each of said precedence levels, wherein the sum of said percentages may exceed 100%;
means for receiving information at said server, said information including data having an indication of the precedence for transmitting said information;
means for evaluating said received data against said plurality of precedence levels; and
if said indication of precedence of said received information matches one of said plurality of precedence levels, passing said information for processing in a priority buffer queue; and
if said indication of precedence of said received information does not match one of said plurality of precedence levels, passing said information for processing in at least one other output queue; and
means for transmitting said information, wherein any information in said priority queue is transmitted before any information in said at least one other output buffer queue.

21. The server of claim 20, wherein the means for evaluating said received data against said plurality of precedence levels further comprises:
means for processing said information in a priority buffer queue comprising:
means for determining if said buffer includes information having said precedence level up to the percentage of said buffer assigned to the precedence of said information;
means for discarding said information if the percentage of said buffer assigned to the precedence of said information has been filled;
means for determining if the buffer is full if the percentage of said buffer assigned to the precedence of said information has not been filled;
means for discarding said information if the buffer is full; and
means for adding said information to a priority output queue for transmission if the buffer is not full.

22. The server of claim 20, wherein the means for evaluating said received data against said plurality of precedence levels further comprises:
means for processing said information in at least one other output buffer queue comprising:
means for determining if said buffer is full;
means for discarding said information if the buffer is full; and;
means for adding said information to a non-priority output queue for transmission if the buffer is not full.

23. A method for passing information over a packet based communication network, comprising the steps of:
determining the buffer size for transmitting said information over the communication network;
determining a plurality of precedence levels for at least a portion of said information passing over said communication network;
assigning a percentage of said buffer to each of said precedence levels, wherein the sum of said percentages may exceed 100%;
receiving information in a data packet, said data packet including a packet header having a field including a Type of Service field for indicating a precedence for transmitting said data packet, wherein said precedence is indicated by a Differentiated Services Code Point within the Type of Service field;
evaluating said received information against said plurality of precedence levels; and
if said indication of precedence of said received information matches one of said plurality of precedence levels, passing said information for processing in a priority buffer queue; and
if said indication of precedence of said received information does not match one of said plurality of precedence levels, passing said information for processing in at least one other output queue; and
transmitting any information in said priority queue before transmitting any information in said at least one other output buffer queue.

24. The method of claim 23, wherein the step of processing said information in a priority buffer queue further comprises the steps of:
determining if said buffer includes information having said precedence level up to the percentage of said buffer assigned to the precedence of said information;
if the percentage of said buffer assigned to the precedence of said information has been filled, discarding said information;
if the percentage of said buffer assigned to the precedence of said information has not been filled, determining if the buffer is full;
if the buffer is full, discarding said information; and
if the buffer is not full, adding said information to a priority output queue for transmission.

25. The method of claim 23, wherein the step of processing said information in at least one other output buffer queue further comprises the steps of:
determining if said buffer is full;
if the buffer is full, discarding said information; and;
if the buffer is not full, adding said information to a non-priority output queue for transmission.

26. The method of claim 23, wherein a larger percentage of said buffer is assigned to information with a higher precedence level.

* * * * *

UNITED STATES PATENT AND TRADEMARK OFFICE
CERTIFICATE OF CORRECTION

PATENT NO.         : 7,050,447 B2
APPLICATION NO. : 10/764656
DATED              : May 23, 2006
INVENTOR(S)        : Steven P. Silverman and Daniel T. Sullivan It is certified that error appears in the above-identified patent and that said Letters Patent is hereby corrected as shown below:

Claim 10 (Column 13, Line 54), replace "said" with --a--.

Claim 10 (Column 13, Line 55), delete "said".

Claim 10 (Column 13, Line 63), replace "a" with --said--.

Claim 10 (Column 13, Line 66), insert --said-- between "in" and "at".

Claim 13 (Column 14, Lines 23-27), cancel claim 13.

Please renumber the claims as follows:
          If claim is a dependent claim and requires new dependency claim No.

| Claim No. | New Claim No. | New Dependency Claim No. |
|---|---|---|
| 14 | 13 | |
| 15 | 14 | 13 |
| 16 | 15 | |
| 17 | 16 | |
| 18 | 17 | 16 |
| 19 | 18 | 16 |
| 20 | 19 | |
| 21 | 20 | 19 |
| 22 | 21 | 19 |
| 23 | 22 | |
| 24 | 23 | 22 |
| 25 | 24 | 22 |
| 26 | 25 | 22 |

Signed and Sealed this

Sixth Day of March, 2007

JON W. DUDAS
*Director of the United States Patent and Trademark Office*